(12) United States Patent
Miyoshi et al.

(10) Patent No.: US 12,060,035 B2
(45) Date of Patent: Aug. 13, 2024

(54) SECURITY SYSTEM, VEHICLE, SECURITY DEVICE, AND VALIDITY DETERMINATION METHOD

(71) Applicant: SUMITOMO ELECTRIC INDUSTRIES, LTD., Osaka (JP)

(72) Inventors: Takanori Miyoshi, Osaka (JP); Isao Kato, Osaka (JP); Satoru Sakurazawa, Osaka (JP); Yoichi Hata, Osaka (JP); Takumi Asaina, Osaka (JP); Yoshikazu Isoyama, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 146 days.

(21) Appl. No.: 17/793,138

(22) PCT Filed: Oct. 16, 2020

(86) PCT No.: PCT/JP2020/039092
§ 371 (c)(1),
(2) Date: Jul. 15, 2022

(87) PCT Pub. No.: WO2021/166321
PCT Pub. Date: Aug. 26, 2021

(65) Prior Publication Data
US 2023/0046939 A1 Feb. 16, 2023

(30) Foreign Application Priority Data
Feb. 18, 2020 (JP) .................................. 2020-025009

(51) Int. Cl.
*B60R 25/04* (2013.01)
*B60R 16/023* (2006.01)
*H04L 67/12* (2022.01)

(52) U.S. Cl.
CPC ............ *B60R 25/04* (2013.01); *B60R 16/023* (2013.01); *H04L 67/12* (2013.01)

(58) Field of Classification Search
CPC ....... B60R 16/02; B60R 16/023; B60R 25/04; F41A 17/063; G05B 19/4183;
(Continued)

(56) References Cited

U.S. PATENT DOCUMENTS

2012/0239249 A1* 9/2012 Aragai .................... B60R 16/03
701/36
2015/0372975 A1* 12/2015 Moriya ............... H04L 63/0281
726/11

(Continued)

FOREIGN PATENT DOCUMENTS

JP 2003-191804 A 7/2003
JP 2009-240065 A 10/2009
(Continued)

*Primary Examiner* — Stephen R Burgdorf
(74) *Attorney, Agent, or Firm* — Oliff PLC

(57) ABSTRACT

A security system includes an information transmission device, and a security device to which a target device is connectable. The information transmission device and the security device are connected to each other via a network. The information transmission device transmits, to the security device, generation information to be used for generating reference identification information. The security device generates the reference identification information by using the generation information received from the information transmission device via the network. The security device acquires identification information of the target device connected to the security device. The security device compares the acquired identification information with the generated reference identification information, and determines validity of the target device connected thereto, based on a result of comparison.

11 Claims, 8 Drawing Sheets

(58) Field of Classification Search
CPC .......... G06F 17/00; G06F 21/31; G06F 21/44;
G06F 21/445; G06F 21/57; G06F 21/62;
G06F 21/81; G06F 21/85; H04L 9/006;
H04L 9/40; H04L 12/12; H04L 12/2821;
H04L 12/40006; H04L 12/40104; H04L
63/0209; H04L 63/0861; H04L 63/0876;
H04L 63/1416; H04L 63/1425; H04L
67/12; H04W 12/06
USPC ...................................................... 340/426.3
See application file for complete search history.

(56) References Cited

U.S. PATENT DOCUMENTS

| | | | |
|---|---|---|---|
| 2016/0098369 A1* | 4/2016 | Berkobin | G06F 13/4068 |
| | | | 710/106 |
| 2019/0179629 A1* | 6/2019 | Roy | H03M 7/30 |
| 2019/0265966 A1* | 8/2019 | Shimomura | B60R 16/023 |
| 2020/0137049 A1* | 4/2020 | Ogawa | H04W 4/40 |
| 2020/0304172 A1* | 9/2020 | Yano | B60R 16/023 |
| 2021/0105321 A1* | 4/2021 | Joyce | H04L 67/1095 |
| 2021/0241552 A1* | 8/2021 | Jonely | G07C 9/00944 |

FOREIGN PATENT DOCUMENTS

| | | |
|---|---|---|
| JP | 2013-193598 A | 9/2013 |
| JP | 2015-098312 A | 5/2015 |
| JP | 2018-030464 A | 3/2018 |
| JP | 2019-129500 A | 8/2019 |

* cited by examiner

SECURITY SYSTEM, VEHICLE, SECURITY DEVICE, AND VALIDITY DETERMINATION METHOD

TECHNICAL FIELD

The present invention relates to a security system, a vehicle, a security device, and a validity determination method.

This application claims priority on Japanese Patent Application No. 2020-25009 filed on Feb. 18, 2020, the entire content of which is incorporated herein by reference.

BACKGROUND ART

PATENT LITERATURE 1 (Japanese Laid-Open Patent Publication No. 2003-191804) discloses a vehicle communication system as follows. That is, in this vehicle communication system, a plurality of electrical devices mounted in a vehicle are provided with communication means for performing data communication via wired communication lines in the vehicle so that data can be transmitted and received between the respective electrical devices. Each of the electrical devices is provided with a plurality of communication means for transmitting the same data using different communication lines, and selection means for selecting normal received data from among a plurality of received data obtained through communication using the plurality of communication means. One of the plurality of communication means is used as low-speed communication means for performing data communication at a communication speed lower than that of the other communication means, thereby making reliability of data communication by the low-speed communication means higher than that of the other communication means.

CITATION LIST

Patent Literature

PATENT LITERATURE 1: Japanese Laid-Open Patent Publication No. 2003-191804

SUMMARY OF THE INVENTION

A security system according to the present disclosure includes: an information transmission device; and a security device to which a target device is connectable. The information transmission device and the security device are connected to each other via a network. The information transmission device transmits, to the security device, generation information to be used for generating reference identification information. The security device generates the reference identification information by using the generation information received from the information transmission device via the network. The security device acquires identification information of the target device connected to the security device. The security device compares the acquired identification information with the generated reference identification information, and determines validity of the target device connected to the security device, based on a result of comparison.

A security device according to the present disclosure is a security device to which a target device is connectable. The security device includes: a reception unit configured to receive generation information from an information transmission device connected to the security device via a network; a generation unit configured to generate reference identification information by using the generation information received by the reception unit; an acquisition unit configured to acquire identification information of the target device connected to the security device; and a determination unit configured to compare the reference identification information generated by the generation unit with the identification information acquired by the acquisition unit, and determine validity of the target device connected to the security device, based on a result of comparison.

A validity determination method according to the present disclosure is a validity determination method used in a security system including an information transmission device and a security device to which a target device is connectable. The information transmission device and the security device are connected to each other via a network. The method includes: transmitting, by the information transmission device, generation information to be used for generating reference identification information, to the security device; generating, by the security device, the reference identification information by using the generation information received from the information transmission device via the network; acquiring, by the security device, identification information of the target device connected to the security device; and, by the security device, comparing the acquired identification information with the generated reference identification information, and determining validity of the target device connected to the security device, based on a result of comparison.

A validity determination method according to the present disclosure is a validity determination method used in a security device to which a target device is connectable. The method includes: receiving generation information from an information transmission device connected to the security device via a network; generating reference identification information by using the received generation information; acquiring identification information of the target device connected to the security device; and comparing the generated reference identification information with the acquired identification information, and determining validity of the target device connected to the security device, based on a result of comparison.

One mode of the present disclosure can be realized not only as a security device that includes such a characteristic processing unit but also as a semiconductor integrated circuit that realizes a part or the entirety of the security device, or as a program for causing a computer to execute process steps in the security device. Moreover, one mode of the present disclosure can be realized as a semiconductor integrated circuit that realizes a part or the entirety of a security system including the security device, or as a program for causing a computer to execute process steps in the security system.

DETAILED DESCRIPTION

Figure 1:
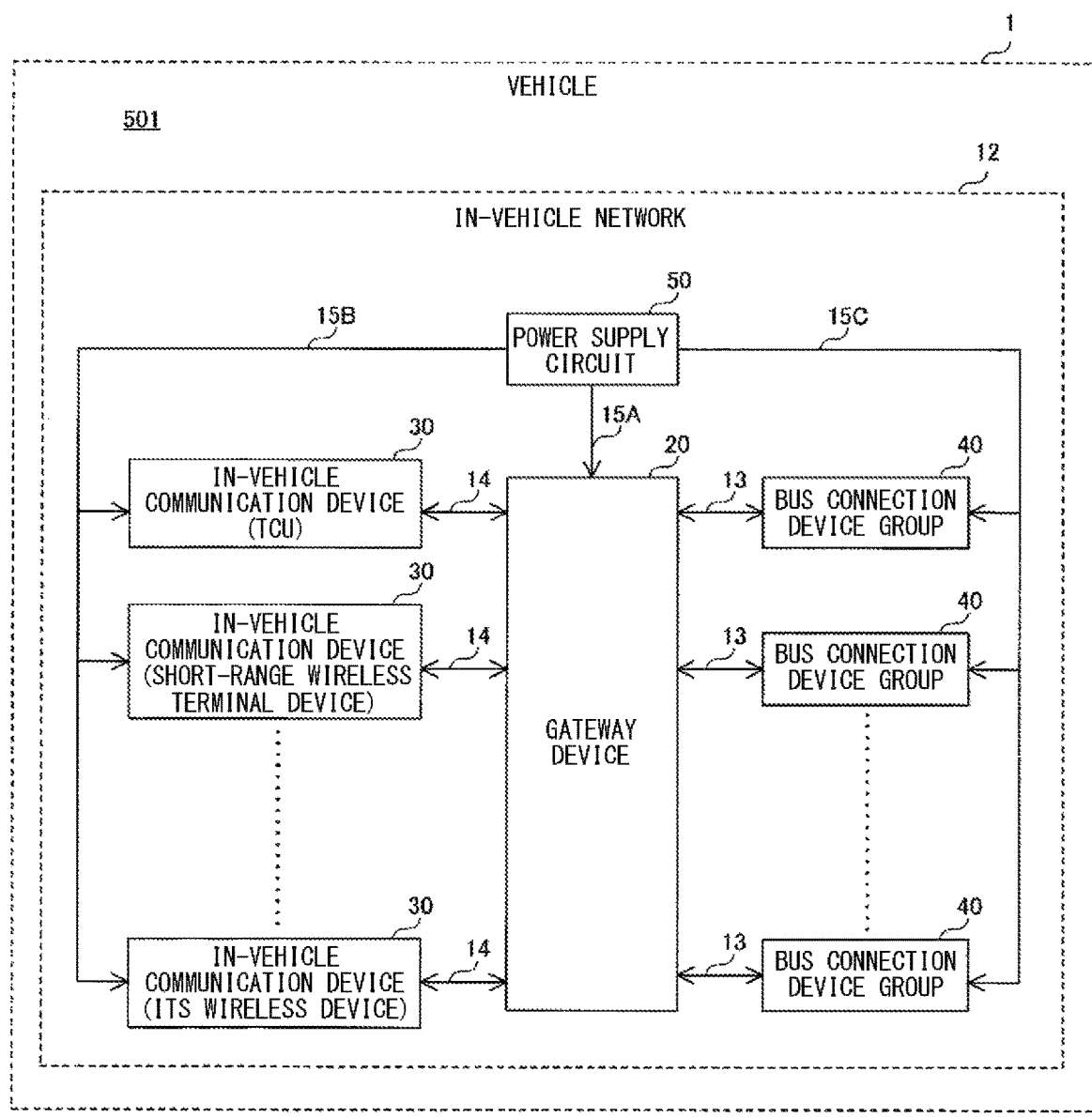
FIG. 1 shows a configuration of a communication system according to a first embodiment of the present disclosure.

To date, technologies for improving security in networks have been developed.

Problems to be Solved by the Present Disclosure

Beyond the technology described in PATENT LITERATURE 1, there is a demand for a technology that can realize an excellent function regarding security in a network.

The present disclosure has been made in order to solve the above problem. An object of the present disclosure is to provide a security system, a vehicle, a security device, and a validity determination method that can realize an excellent function regarding security in a network.

Effects of the Present Disclosure

According to the present disclosure, it is possible to realize an excellent function regarding security in a network.

Description of Embodiments of the Present Disclosure

First, contents of embodiments of the present disclosure are listed and described.

(1) A security system according to an embodiment of the present disclosure includes: an information transmission device; and a security device to which a target device is connectable. The information transmission device and the security device are connected to each other via a network. The information transmission device transmits, to the security device, generation information to be used for generating reference identification information. The security device generates the reference identification information by using the generation information received from the information transmission device via the network. The security device acquires identification information of the target device connected to the security device. The security device compares the acquired identification information with the generated reference identification information, and determines validity of the target device connected to the security device, based on a result of comparison.

In the above configuration, the reference identification information is generated by using the generation information transmitted between the information transmission device and each of dispersedly arranged security devices, and validity of the target device is determined by using the generated reference identification information. Therefore, for example, even when one of the information transmission device and the security device is attacked, an invalid target device connected to the security device can be more reliably detected. Therefore, it is possible to realize an excellent function regarding security in the network.

(2) Preferably, the security device controls supply of power to the target device, according to a result of determination on validity of the target device.

In the above configuration, for example, when the target device connected to the security device is an invalid device, control to interrupt supply of power to the target device can be performed, thereby improving security.

(3) More preferably, the security device is able to individually control supply of power to a transmission circuit that is a circuit for transmitting the identification information to the security device, and supply of power to a target circuit that is a circuit included in the target device and different from the transmission circuit. The security device starts to supply power to the transmission circuit upon receiving the generation information from the information transmission device, and starts to supply power to the target circuit upon determining that the target device is valid.

In the above configuration, in a period until validity of the target device is determined, supply of power to the transmission circuit is started while supply of power to the target circuit is stopped. Thus, operation of an invalid target device can be limited while the identification information of the target device is provided. Therefore, for example, when the network is started up, validity of the target device can be determined before the target device is operated.

(4) More preferably, the security device stops supply of power to the transmission circuit upon determining that the target device is not valid.

In the above configuration, for example, security can be improved and power consumption can be reduced by interrupting supply of power to an invalid target device connected to the security device.

(5) More preferably, the security device does not start to supply power to the target circuit upon determining that the target device is not valid.

In the above configuration, for example, security can be improved and power consumption can be reduced by not performing supply of power to an invalid target device connected to the security device.

(6) Preferably, the network includes a communication line and an auxiliary line. The target device communicates with other equipment connected to the network, via the communication line, and the information transmission device transmits the generation information to the security device via the auxiliary line.

In the above configuration, the generation information can be transmitted from the information transmission device to the security device via the auxiliary line separate from the communication line. Therefore, security can be more improved by redundancy. Furthermore, for example, if a power supply line is used as the auxiliary line, the cost required for implementation of the security system can be reduced as compared to a configuration in which an auxiliary line is separately added to the conventional network.

(7) More preferably, upon determining that the target device is not valid, the security device performs at least one of: interrupting the communication line; transmitting an error notification to the communication line; and generating jamming in the communication line.

In the above configuration, an invalid access by an invalid device can be prevented from increasing.

(8) More preferably, the auxiliary line is a power supply line for supplying power to the security device.

In the above configuration, the cost required for implementation of the security system can be reduced as compared to the configuration in which an auxiliary line is separately added to the conventional network.

(9) Preferably, the security system further includes a connector used in the target device and configured to connect the target device to the security device. The connector includes: a storage unit configured to store therein the identification information; and a transmission circuit that is a circuit for transmitting the identification information in the storage unit to the security device.

In the above configuration, the security device can acquire the identification information from the target device that does not include a configuration of a transmission circuit or the like, via the connector. Therefore, it is possible to easily constitute a security system capable of determining validity of an existing target device that does not include a configuration of a transmission circuit or the like.

(10) A vehicle according to the first embodiment of the present disclosure includes the security system.

In the above configuration, an excellent function regarding security in the network can be realized in the vehicle including the security system.

(11) A security device according to the embodiment of the present disclosure is a security device to which a target device is connectable. The security device includes: a reception unit configured to receive generation information from an information transmission device connected to the security device via a network; a generation unit configured to generate reference identification information by using the generation information received by the reception unit; an acquisition unit configured to acquire identification information of the target device connected to the security device; and a determination unit configured to compare the reference identification information generated by the generation unit with the identification information acquired by the acquisition unit, and determine validity of the target device connected to the security device, based on a result of comparison.

In the above configuration, the reference identification information is generated by using the generation information transmitted between the information transmission device and each of dispersedly arranged security devices, and validity of the target device is determined by using the generated reference identification information. Therefore, for example, even when one of the information transmission device and the security device is attacked, an invalid target device connected to the security device can be more reliably detected. Therefore, it is possible to realize an excellent function regarding security in the network.

(12) A validity determination method according to the embodiment of the present disclosure is a validity determination method used in a security system including an information transmission device and a security device to which a target device is connectable. The information transmission device and the security device are connected to each other via a network. The method includes: transmitting, by the information transmission device, generation information to be used for generating reference identification information, to the security device; generating, by the security device, the reference identification information by using the generation information received from the information transmission device via the network; acquiring, by the security device, identification information of the target device connected to the security device; and, by the security device, comparing the acquired identification information with the generated reference identification information, and determining validity of the target device connected to the security device, based on a result of comparison.

In the above method, the reference identification information is generated by using the generation information transmitted between the information transmission device and each of dispersedly arranged security devices, and validity of the target device is determined by using the generated reference identification information. Therefore, for example, even when one of the information transmission device and the security device is attacked, an invalid target device connected to the security device can be more reliably detected. Therefore, it is possible to realize an excellent function regarding security in the network.

(13) A validity determination method according to the embodiment of the present disclosure is a validity determination method used in a security device to which a target device is connectable. The method includes: receiving generation information from an information transmission device connected to the security device via a network; generating reference identification information by using the received generation information; acquiring identification information of the target device connected to the security device; and comparing the generated reference identification information with the acquired identification information, and determining validity of the target device connected to the security device, based on a result of comparison.

In the above method, the reference identification information is generated by using the generation information transmitted between the information transmission device and each of dispersedly arranged security devices, and validity of the target device is determined by using the generated reference identification information. Therefore, for example, even when one of the information transmission device and the security device is attacked, an invalid target device connected to the security device can be more reliably detected. Therefore, it is possible to realize an excellent function regarding security in the network.

Hereinafter, embodiments of the present disclosure will be described with reference to the drawings. In the drawings, the same or corresponding parts are denoted by the same reference signs, and description thereof is not repeated. At least some parts of the embodiment described below may be combined as desired.

First Embodiment

Configuration and Basic Operation

FIG. 1 shows a configuration of a communication system according to a first embodiment of the present disclosure.

With reference to FIG. 1, a communication system 501 includes a gateway device 20, a plurality of in-vehicle communication devices 30, a plurality of bus connection device groups 40, and a power supply circuit 50.

The communication system 501 is mounted in a vehicle 1, for example. The communication system 501 may be used for a home network or factory automation.

The plurality of in-vehicle communication devices 30 are connected to the gateway device 20 via corresponding cables 14. Each cable 14 is an Ethernet (registered trademark) cable, for example. The plurality of bus connection device groups 40 are connected to the gateway device 20 via corresponding buses 13.

The power supply circuit 50 is connected to the gateway device 20 via a power supply line 15A, is connected to the in-vehicle communication devices 30 via a power supply line 15B, and is connected to the bus connection device groups 40 via a power supply line 15C. Hereinafter, each of the power supply lines 15A, 15B, 15C is also referred to as a power supply line 15. The power supply circuit 50 supplies power to the gateway device 20, the in-vehicle communication devices 30, and the bus connection device groups 40 via the power supply lines 15.

An in-vehicle network 12 includes the gateway device 20, the buses 13, the Ethernet cables 14, and the power supply lines 15.

Figure 2:
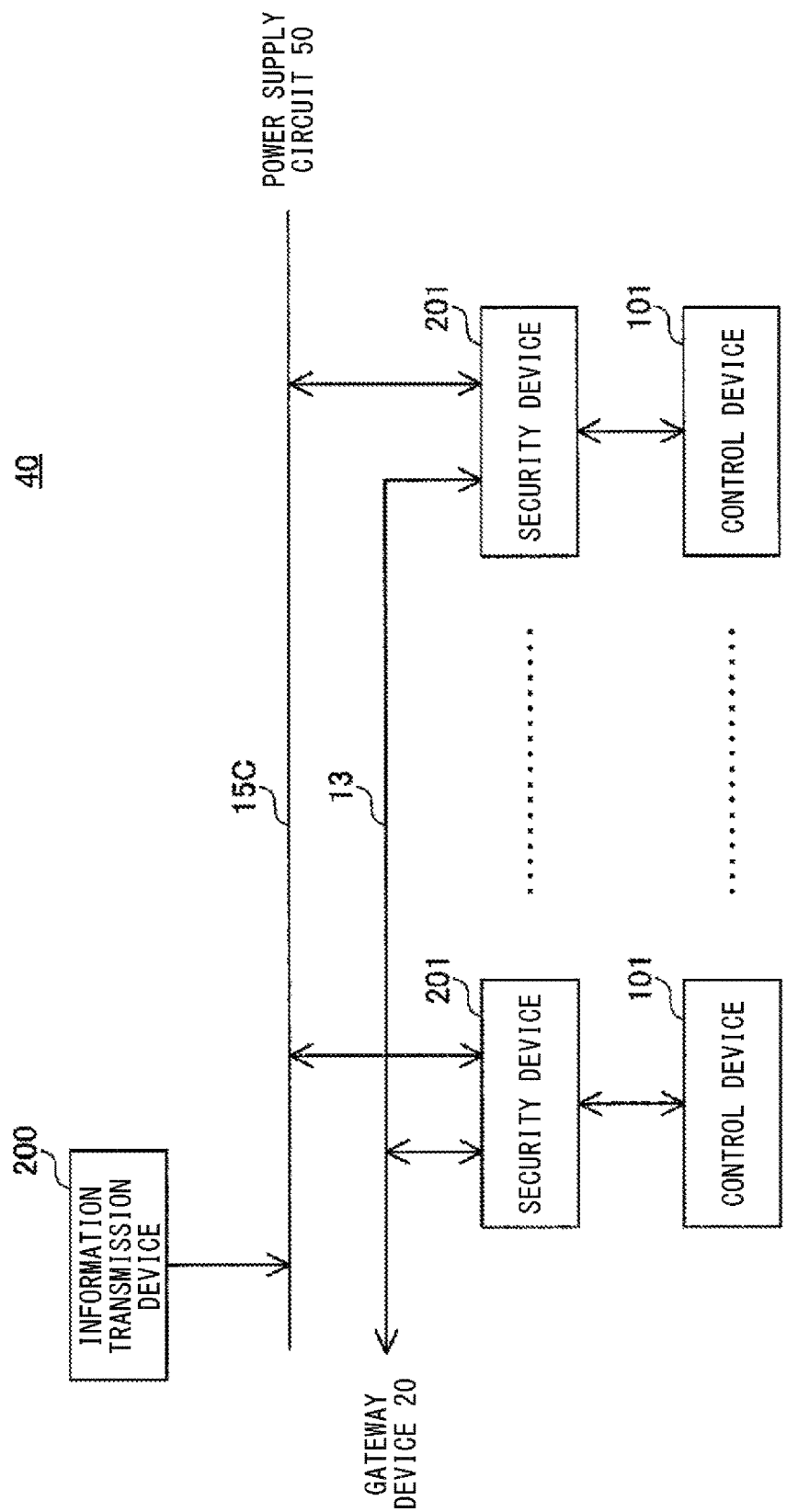
FIG. 2 shows a configuration of a bus connection device group according to the first embodiment of the present disclosure.

FIG. 2 shows a configuration of a bus connection device group according to the first embodiment of the present disclosure.

With reference to FIG. 2, the bus connection device group 40 includes a plurality of security devices 201 connected to the bus 13 and the power supply line 15C, and a plurality of control devices 101. The gateway device 20, the in-vehicle communication devices 30, and the control devices 101 are examples of in-vehicle devices. The power supply line 15C is a power supply line for supplying power to the security devices 201.

A control device 101 can be connected to each security device 201. In the example shown in FIG. 2, to each of the plurality of security devices 201, the corresponding control device 101 is connected.

The control device 101 connected to the security device 201 communicates with equipment, such as another control device 101 connected to the in-vehicle network 12, via the bus 13. The bus 13 is an example of a communication line. The control device 101 is an example of a target device.

An information transmission device 200 is connected to the power supply line 15C. The information transmission device 200 will be described later in detail. The power supply line 15C is an example of an auxiliary line.

Each control device 101 is an ECU (Electronic Control Unit), for example. The bus connection device group 40 may not necessarily include a plurality of control devices 101, and may include one control device 101. Some of the control devices 101 in the bus connection device group 40 may not necessarily be connected to the bus 13 and the power supply line 15C via the security devices 201, and may be directly connected to the bus 13 and the power supply line 15C.

The communication system 501 may not necessarily include the control devices 101 while including the in-vehicle communication devices 30, may not necessarily include the in-vehicle communication devices 30 while including the control devices 101, or may include one in-vehicle communication device 30 and one control device 101.

Each in-vehicle communication device 30 communicates with devices outside the vehicle 1, for example. Specifically, examples of the in-vehicle communication devices 30 include a TCU (Telematics Control Unit), a short-range wireless terminal device, and an ITS (Intelligent Transport Systems) wireless device.

Each bus 13 is a bus according to, for example, a standard of CAN (Controller Area Network) (registered trademark), FlexRay (registered trademark), MOST (Media Oriented Systems Transport) (registered trademark), Ethernet, LIN (Local Interconnect Network), or the like.

In this example, each security device 201 in the bus connection device group 40 is connected to the gateway device 20 via the corresponding bus 13 according to the CAN standard.

The buses 13 are provided for different types of systems, for example. Specifically, the buses 13 are implemented as a drive-related bus, a chassis/safety-related bus, a body/electrical-equipment-related bus, and an AV/information-related bus, for example.

An engine control device, an AT (Automatic Transmission) control device, and an HEV (Hybrid Electric Vehicle) control device, which are examples of the control device 101, are connected to the security devices 201 in the drive-related bus. The engine control device, the AT control device, and the HEV control device control an engine, an AT, and switching between the engine and a motor, respectively.

A brake control device, a chassis control device, and a steering control device, which are examples of the control device 101, are connected to the security devices 201 in the chassis/safety-related bus. The brake control device, the chassis control device, and the steering control device control a brake, a chassis, and steering, respectively.

An instrument indication control device, an air conditioner control device, a burglar prevention control device, an air bag control device, and a smart entry control device, which are examples of the control device 101, are connected to the security devices 201 in the body/electrical-equipment-related bus. The instrument indication control device, the air conditioner control device, the burglar prevention control device, the air bag control device, and the smart entry control device control instruments, an air conditioner, a burglar prevention mechanism, an air bag mechanism, and smart entry, respectively.

A navigation control device, an audio control device, an ETC (Electronic Toll Collection System) (registered trademark) control device, and a telephone control device, which are examples of the control device 101, are connected to the security devices 201 in the AV/information-related bus. The navigation control device, the audio control device, the ETC control device, and the telephone control device control a navigation device, an audio device, an ETC device, and a mobile phone, respectively.

The gateway device 20 is, for example, a central gateway (CGW), and can communicate with other in-vehicle devices.

For example, the gateway device 20 performs, in the vehicle 1, a relay process of relaying; information transmitted/received between the control devices 101 connected to different buses 13 via corresponding security devices 201; information transmitted/received between the in-vehicle communication devices 30; and information transmitted/received between a control device 101 and an in-vehicle communication device 30.

[Security System]

Figure 3:
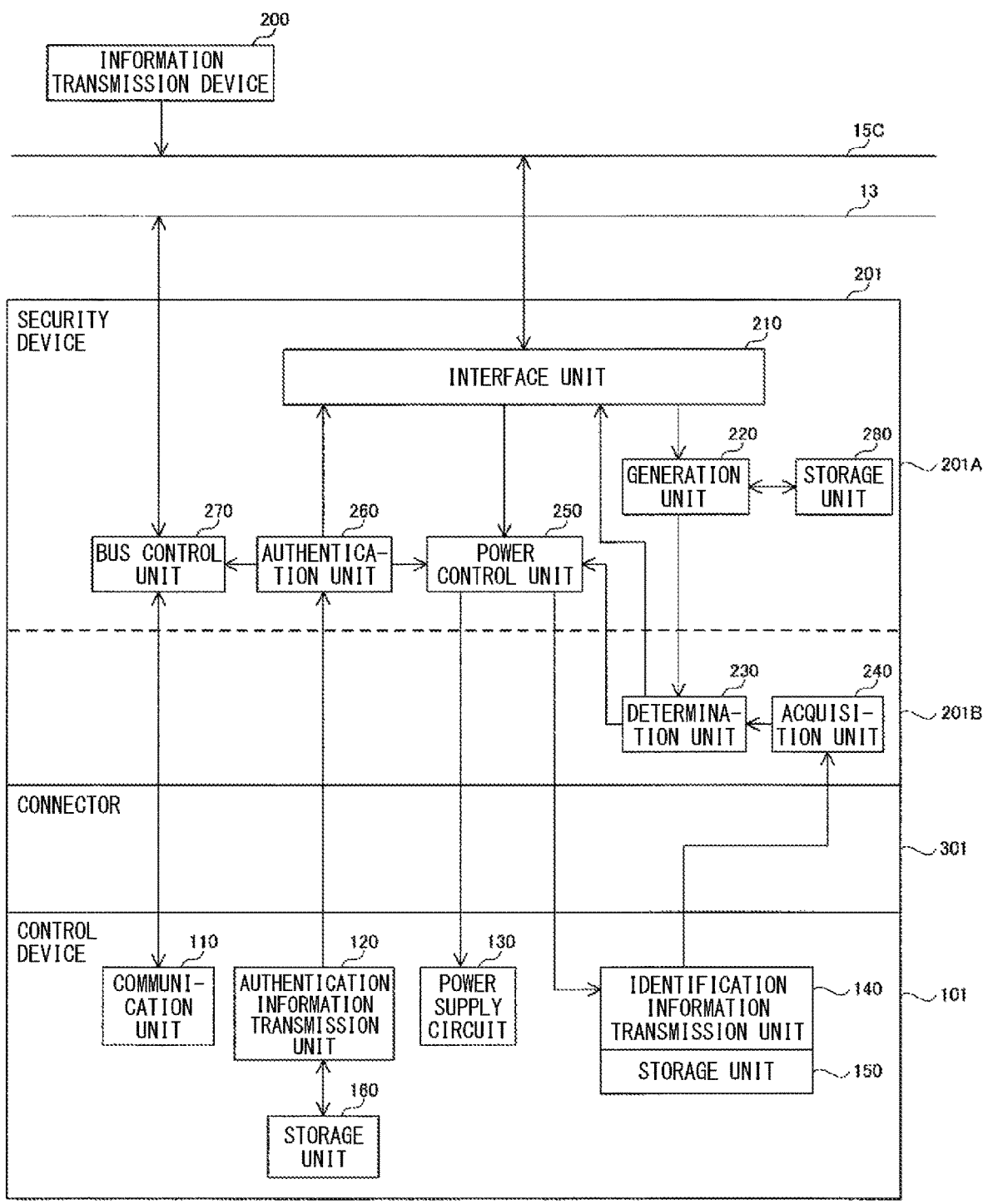
FIG. 3 shows a configuration of a security system according to the first embodiment of the present disclosure.

FIG. 3 shows a configuration of a security system according to the first embodiment of the present disclosure.

With reference to FIG. 3, a security system 401 includes an information transmission device 200, a security device 201, and a connector 301 used for a control device 101. For example, the connector 301 is mounted on a substrate of the control device 101.

The security device 201 includes a main body portion 201A, and a connection portion 201B to which the connector 301 can be connected. For example, the connection portion 201B is a connector used for the security device 201 and is mounted on a substrate of the main body portion 201A.

The main body portion 201A of the security device 201 includes an interface unit 210, a generation unit 220, a power control unit 250, an authentication unit 260, a bus control unit 270, and a storage unit 280. The connection portion 201B of the security device 201 includes a determination unit 230 and an acquisition unit 240. The interface unit 210, the generation unit 220, the determination unit 230, the acquisition unit 240, the power control unit 250, the authentication unit 260, and the bus control unit 270 are realized by a processor such as a CPU (Central Processing Unit) or a DSP (Digital Signal Processor), for example. The storage unit 280 is a nonvolatile memory, for example.

The control device 101 includes a communication unit 110, an authentication information transmission unit 120, a power supply circuit 130, an identification information transmission unit 140, a storage unit 150, and a storage unit 160. The communication unit 110 is realized by a communication IC (Integrated Circuit), for example. The authentication information transmission unit 120 and the identification information transmission unit 140 are realized by a processor such as a CPU or a DSP, for example. The storage units 150, 160 are nonvolatile memories, for example. The identification information transmission unit 140 is an example of a transmission circuit that is a circuit for transmitting identification information to the security device 201. The power supply circuit 130 is an example of a target circuit.

The security device 201 can be connected to the control device 101 via the connector 301. More specifically, the security device 201 is connected to the control device 101 via the connector 301 with the connection portion 201B being fitted to the connector 301.

More specifically, the acquisition unit 240 in the security device 201 is connected to the identification information transmission unit 140 in the control device 101 via the connector 301. The power control unit 250 in the security device 201 is connected to the identification information transmission unit 140 and the power supply circuit 130 in the control device 101 via the connector 301. The authentication unit 260 in the security device 201 is connected to the authentication information transmission unit 120 in the control device 101 via the connector 301. The bus control unit 270 in the security device 201 is connected to the communication unit 110 in the control device 101 via the connector 301.

The information transmission device 200 and the security device 201 are connected to each other via the in-vehicle network 12. More specifically, the information transmission device 200 and the security device 201 are connected to each other via the power supply line 15C.

[Information Transmission Device]

The information transmission device 200 transmits, to the security device 201, generation information to be used for generating reference identification information.

More specifically, as described later, the security device 201 generates reference identification information, and determines validity of the control device 101, based on a result of comparison between the generated reference identification information and identification information of the control device 101.

The information transmission device 200 transmits, to the security device 201, generation information to be used for generating the reference identification information.

For example, the information transmission device 200 transmits, to the security device 201, the generation information including a key used for generating the reference identification information.

For example, the information transmission device 200 transmits the generation information to the security device 201 via the power supply line 15C. More specifically, the information transmission device 200 generates a frame according to the CAN standard, for example, in which the generation information is stored, and transmits the generated frame to the security device 201 via the power supply line 15C.

The information transmission device 200 transmits the generation information to some or all of the security devices 201 in the in-vehicle network 12 each time an ignition power supply of the vehicle 1 is turned on and the in-vehicle network 12 is started up, for example.

The information transmission device 200 may transmit generation information whose content varies for each security device 201, or may transmit generation information of the same content to a plurality of security devices 201.

[Security Device]

(Generation of Reference Identification Information)

The security device 201 generates reference identification information by using generation information received from the information transmission device 200 via the in-vehicle network 12.

More specifically, the interface unit 210 receives the generation information from the information transmission device 200 connected to the security device 201 via the in-vehicle network 12. Then, the generation unit 220 generates reference identification information by using the generation information received by the interface unit 210. The interface unit 210 is an example of a reception unit.

For example, upon receiving a frame in which the generation information is stored, from the information transmission device 200 via the power supply line 15C, the interface unit 210 acquires the generation information from the received frame. The interface unit 210 outputs the acquired generation information to the generation unit 220.

Upon receiving the generation information from the interface unit 210, the generation unit 220 generates reference identification information by using the received generation information. For example, the generation unit 220 generates reference identification information including information according to the content of the received generation information.

The storage unit 280 stores therein a hash function for generating a hash value from a key, for example. Specifically, the storage unit 280 stores therein a program for data processing that is performed using the hash function, for example.

Upon receiving the generation information from the interface unit 210, the generation unit 220, for example, reads out the program from the storage unit 280, executes the program, and inputs a key included in the generation information into the hash function, thereby acquiring a hash value which is the reference identification information. The generation unit 220 outputs the acquired hash value to the determination unit 230.

(Acquisition of Identification Information)

The security device 201 acquires the identification information of the control device 101 connected thereto. More specifically, the acquisition unit 240 in the security device 201 acquires the identification information of the control device 101 connected to the security device 201.

For example, the security device 201 can individually control supply of power to the identification information transmission unit 140 in the control device 101 and supply of power to the power supply circuit 130 in the control device 101. Upon receiving the generation information from the information transmission device 200, the security device 201 starts to supply power to the identification information transmission unit 140.

More specifically, the power control unit 250 performs a control of selecting whether or not to output, to the power supply circuit 130, a power supply voltage received from the power supply circuit 50 via the power supply line 15C and the interface unit 210.

Upon acquiring the generation information from the frame received from the information transmission device 200, the interface unit 210 outputs, to the power control unit 250, a supply instruction S1 to start supply of power to the identification information transmission unit 140 in the control device 101.

Upon receiving the supply instruction S1 from the interface unit 210, the power control unit 250 starts to output the power supply voltage to the identification information transmission unit 140 in the control device 101, according to the received supply instruction S1.

For example, the storage unit 150 in the control device 101 stores therein the ID of the control device 101.

Upon receiving supply of power from the power control unit 250 in the security device 201, the identification information transmission unit 140 in the control device 101 acquires the ID from the storage unit 150, and transmits, to the acquisition unit 240 in the security device 201, identification information including the acquired ID.

Upon receiving the identification information from the identification information transmission unit 140 in the control device 101, the acquisition unit 240 in the security device 201 outputs the received identification information to the determination unit 230.

(Determination of Validity)

The security device 201 compares the acquired identification information with the generated reference identification information, and determines validity of the control device 101 connected to the security device 201, based on the comparison result.

More specifically, the determination unit 230 in the security device 201 compares the reference identification information generated by the generation unit 220 with the identification information acquired by the acquisition unit 240, and determines validity of the control device 101 connected to the security device 201, based on the comparison result.

For example, upon receiving the identification information from the acquisition unit 240, the determination unit 230 compares the ID included in the received identification information with the identification information, i.e., the hash value, received from the generation unit 220.

When the ID matches the hash value, the determination unit 230 determines that the control device 101 connected to the security device 201 is valid. Meanwhile, when the ID does not match the hash value, the determination unit 230 determines that the control device 101 connected to the security device 201 is not valid.

For example, the security device 201 controls supply of power to the control device 101, according to the determination result on validity of the control device 101. Specifically, upon determining that the control device 101 is valid, the security device 201 starts to supply power to the power supply circuit 130 in the control device 101. Meanwhile, upon determining that the control device 101 is not valid, the security device 201 does not start to supply power to the power supply circuit 130 in the control device 101.

More specifically, upon determining that the control device 101 connected to the security device 201 is valid, the determination unit 230 outputs, to the power control unit 250, a supply instruction S2 to start supply of power to the power supply circuit 130 in the control device 101.

Upon receiving the supply instruction S2 from the determination unit 230, the power control unit 250 starts to output a power supply voltage to the power supply circuit 130, according to the received supply instruction S2.

Upon receiving supply of power from the power control unit 250 in the security device 201, the power supply circuit 130 starts to supply power to each of the circuits in the control device 101.

Meanwhile, for example, upon determining that the control device 101 is not valid, the security device 201 stops supply of power to the identification information transmission unit 140 in the control device 101.

More specifically, upon determining that the control device 101 connected to the security device 201 is not valid, the determination unit 230 outputs, to the power control unit 250, a stop instruction S3 to stop supply of power to the identification information transmission unit 140 in the control device 101.

Upon receiving the stop instruction S3 from the determination unit 230, the power control unit 250 stops output of the power supply voltage to the identification information transmission unit 140, according to the received stop instruction S3.

Moreover, upon determining that the control device 101 connected to the security device 201 is not valid, the determination unit 230 transmits determination information indicating that the control device 101 is not valid, to the information transmission device 200 via the interface unit 210 and the power supply line 15C.

For example, upon determining that the control device 101 connected to the security device 201 is not valid, the determination unit 230 performs a process of interrupting the bus 13. Moreover, for example, upon determining that the control device 101 connected to the security device 201 is not valid, the determination unit 230 transmits an error notification to the bus 13 via the interface unit 210. Moreover, for example, upon determining that the control device 101 connected to the security device 201 is not valid, the determination unit 230 generates jamming in the bus 13 via the interface unit 210. The determination unit 230, upon determining that the control device 101 connected to the security device 201 is not valid, may not necessarily perform some or all of the process of interrupting the bus 13, the process of transmitting an error notification to the bus 13, and the process of generating jamming in the bus 13.

(Authentication Process)

When the determination unit 230 has determined that a control device 101 is valid, the authentication unit 260 in the security device 201 performs an authentication process for the control device 101.

For example, the storage unit 160 in the control device 101 stores therein authentication information such as a MAC (Media Access Control) address used for authenticating the control device 101.

Upon receiving power supplied from the power supply circuit 130, the authentication information transmission unit 120 in the control device 101 acquires the authentication information from the storage unit 160, and transmits the acquired authentication information to the authentication unit 260 in the security device 201 via the connector 301.

Upon receiving the authentication information from the authentication information transmission unit 120 in the control device 101, the authentication unit 260 in the security device 201 performs an authentication process for the control device 101, based on the received authentication information.

The authentication unit 260, which has succeeded in authentication of the control device 101, outputs, to the bus control unit 270, authentication success information indicating that the authentication has been successful.

For example, the communication unit 110 in the control device 101 receives, from a processing unit (not shown), various kinds of information such as control information addressed to another in-vehicle device connected to the in-vehicle network 12, and transmits the received various kinds of information to the bus control unit 270 in the security device 201 via the connector 301.

Upon receiving the authentication success information from the authentication unit 260, the bus control unit 270 permits the control device 101 to transmit the various kinds of information by using the bus 13. More specifically, after receiving the authentication success information from the authentication unit 260, the bus control unit 270 relays the various kinds of information received from the control device 101, to the destination in-vehicle device via the bus 13, and relays the various kinds of information received from the in-vehicle device via the bus 13, to the control device 101 via the connector 301.

Meanwhile, the authentication unit 260, which has failed in authentication of the control device 101, transmits, to the information transmission device 200 via the interface unit 210 and the power supply line 15C, authentication failure information indicating that the authentication has failed. The authentication unit 260 may transmit the authentication failure information to a higher-order device inside the vehicle 1 or outside the vehicle 1 via the bus control unit 270 and the bus 13.

The authentication unit 260, which has failed in authentication of the control device 101, outputs, to the power control unit 250, a stop instruction S4 to stop supply of power to the power supply circuit 130 and the identification information transmission unit 140 in the control device 101.

Upon receiving the stop instruction S4 from the authentication unit 260, the power control unit 250 stops output of the power supply voltage to the power supply circuit 130 and the identification information transmission unit 140, according to the received stop instruction S4.

[Operation Flow]

Each device in the communication system according to the embodiment of the present disclosure includes a computer that includes a memory. An arithmetic processing unit such as a CPU in the computer reads out a program including a part or all of steps of the flowchart and sequence described below from the memory, and executes the program. The programs for the plurality of devices can be installed from outside, respectively. The programs for the plurality of devices are each distributed in a state of being stored in a storage medium.

Figure 4:
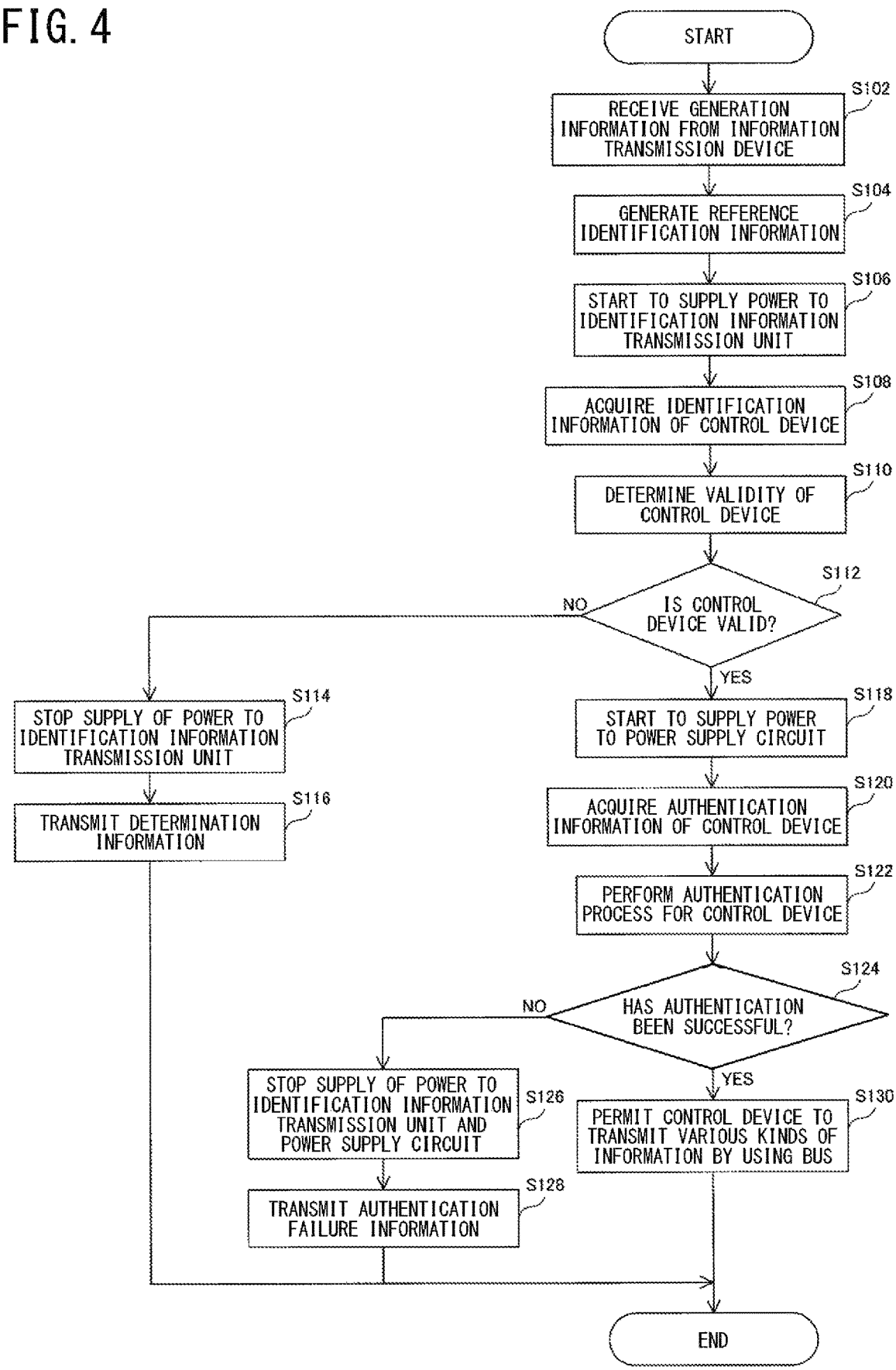
FIG. 4 is a flowchart describing an example of an operation procedure when a security device in the security system according to the first embodiment of the present disclosure determines validity of a control device connected thereto.

FIG. 4 is a flowchart describing an example of an operation flow when a security device in the security system according to the first embodiment of the present disclosure determines validity of a control device connected to the security device.

With reference to FIG. 4, first, the security device 201 receives generation information from the information transmission device 200 (step S102).

Next, the security device 201 generates reference identification information by using the received generation information (step S104).

Next, the security device 201 starts to supply power to the identification information transmission unit 140 in the control device 101 connected thereto (step S106).

Next, the security device 201 acquires identification information of the control device 101 connected thereto. More specifically, the security device 201 receives the identification information from the identification information transmission unit 140 in the control device 101 (step S108).

Next, the security device 201 compares the generated reference identification information with the acquired identification information, and determines validity of the control device 101 connected thereto, based on the comparison result (step S110).

Upon determining that the control device 101 connected thereto is not valid (NO in step S112), the security device 201 stops supply of power to the identification information transmission unit 140 in the control device 101 (step S114).

Next, the security device 201 transmits determination information indicating that the control device 101 is not valid, to the information transmission device 200 via the interface unit 210 and the power supply line 15C (step S116).

Meanwhile, upon determining that the control device 101 connected thereto is valid (YES in step S112), the security device 201 starts to supply power to the power supply circuit 130 in the control device 101 (step S118).

Next, the security device 201 acquires authentication information of the control device 101 connected thereto. More specifically, the security device 201 receives the authentication information from the authentication information transmission unit 120 in the control device 101 (step S120).

Next, the security device 201 performs an authentication process for the control device 101, based on the authentication information (step S122).

Next, when the security device 201 has failed in authentication of the control device 101 (NO in step S124), the security device 201 stops supply of power to the identification information transmission unit 140 and the power supply circuit 130 in the control device 101 (step S126).

Next, the security device 201 transmits authentication failure information indicating that the authentication of the control device 101 has failed, to the information transmission device 200 via the interface unit 210 and the power supply line 15C (step S128).

Meanwhile, when the security device 201 has succeeded in authentication of the control device 101 (YES in step S124), the security device 201 permits the control device 101 to transmit various kinds of information by using the bus 13 (step S130).

Figure 5:
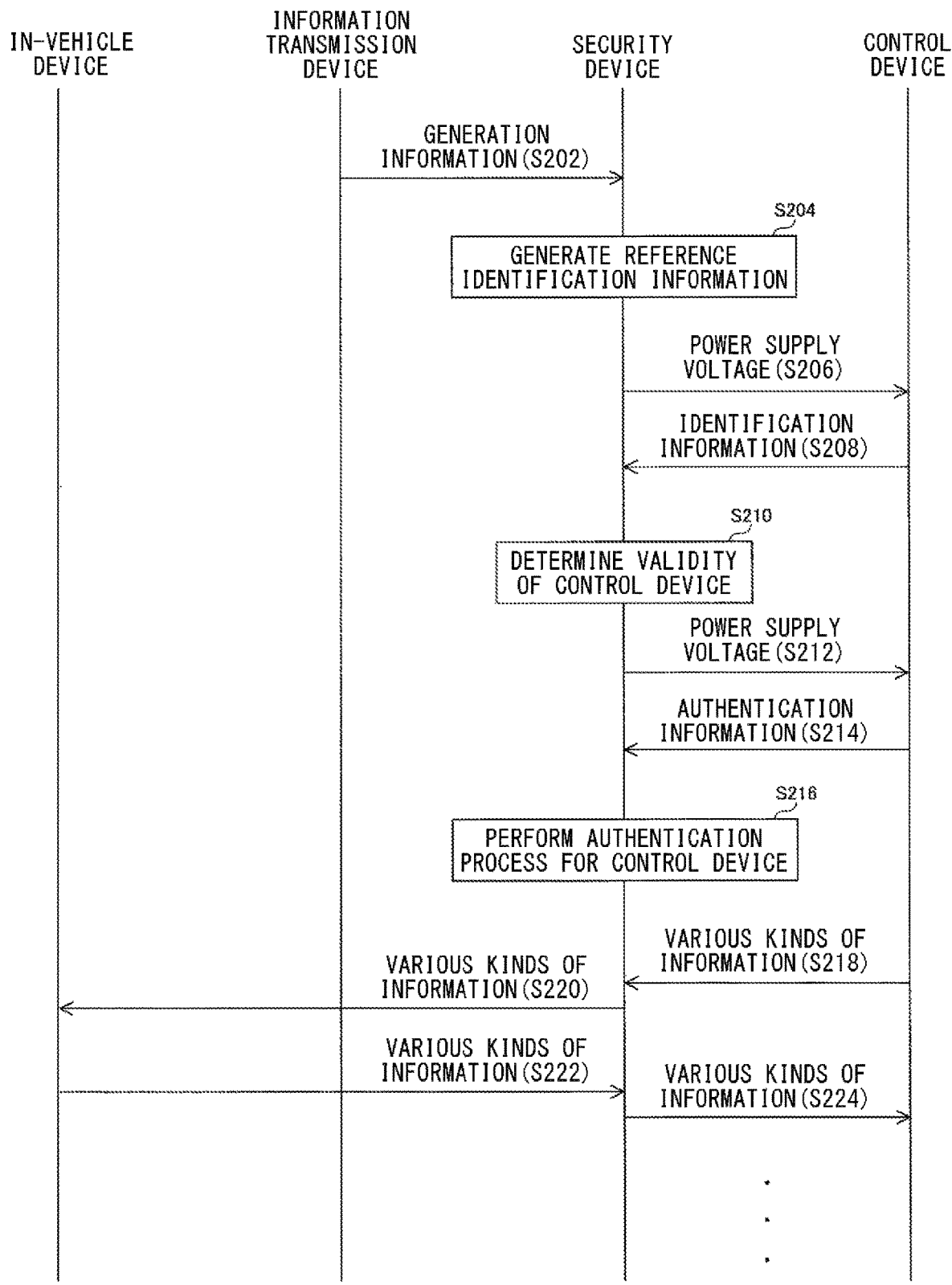
FIG. 5 shows an example of a sequence of a validity determination process in the security system according to the first embodiment of the present disclosure.

FIG. 5 shows an example of a sequence of a validity determination process in the security system according to the first embodiment of the present disclosure.

With reference to FIG. 5, first, the information transmission device 200 transmits generation information to the security device 201 when the ignition power supply of the vehicle 1 has been turned on and the in-vehicle network 12 is started up (step S202).

Next, the security device 201 generates reference identification information by using the received generation information (step S204).

Next, the security device 201 starts to output a power supply voltage to the identification information transmission unit 140 in the control device 101 connected thereto (step S206).

Next, the security device 201 acquires identification information of the control device 101 connected thereto. More specifically, the identification information transmission unit 140 in the control device 101 transmits, to the security device 201, the identification information including the ID of the control device 101 (step S208).

Next, the security device 201 compares the generated reference identification information with the acquired identification information, and determines validity of the control device 101 connected thereto, based on the comparison result (step S210).

Upon determining that the control device 101 connected thereto is valid, the security device 201 starts to output the power supply voltage to the power supply circuit 130 in the control device 101 (step S212).

Next, the security device 201 acquires authentication information of the control device 101 connected thereto. More specifically, the authentication information transmission unit 120 in the control device 101 transmits the authentication information to the security device 201 (step S214).

Next, the security device 201 performs an authentication process for the control device 101, based on the authentication information (step S216).

When the security device 201 has succeeded in authentication of the control device 101, the security device 201 permits the control device 101 to transmit various kinds of information by using the bus 13. More specifically, after the authentication of the control device 101 has been successful, when the security device 201 has received the various kinds of information from the control device 101 (step S218), the security device 201 relays the received information to a destination in-vehicle device via the bus 13 (step S220). When the security device 201 has received various kinds of information from the in-vehicle device via the bus 13 (step S222), the security device 201 relays the received information to the control device 101 (step S224).

In the security system 401 according to the first embodiment of the present disclosure, the security device 201 controls supply of power to the control device 101, according to the determination result on validity of the control device 101. However, the present disclosure is not limited thereto. The security device 201 may perform supply of power to the control device 101, regardless of the determination result on validity of the control device 101.

In the security system 401 according to the first embodiment of the present disclosure, the security device 201 can individually control supply of power to the identification information transmission unit 140 in the control device 101 and supply of power to the power supply circuit 130 in the control device 101. However, the present disclosure is not limited thereto. The security device 201 need not be able to individually control supply of power to the identification information transmission unit 140 and supply of power to the power supply circuit 130. More specifically, the security device 201 may start supply of power to the identification information transmission unit 140 and the power supply circuit 130 upon receiving the generation information from the information transmission device 200.

In the security system 401 according to the first embodiment of the present disclosure, the information transmission device 200 transmits the generation information to the security device 201 via the power supply line 15C. However, the present disclosure is not limited thereto. The information transmission device 200 may transmit the generation information to the security device 201 via the bus 13.

Incidentally, there is a demand for a technology that can realize an excellent function regarding security in a network.

To meet the demand, in the security system 401 according to the first embodiment of the present disclosure, the information transmission device 200 and the security device 201 are connected to each other via the in-vehicle network 12. The information transmission device 200 transmits, to the security device 201, generation information to be used for generating reference identification information. The security device 201 generates reference identification information by using the generation information received from the information transmission device 200 via the in-vehicle network 12. The security device 201 acquires identification information of the control device 101 connected thereto. The security device 201 compares the acquired identification information with the generated reference identification information, and determines validity of the control device 101 connected thereto, based on the comparison result.

A validity determination method according to the first embodiment of the present disclosure is a validity determination method used in the security system 401 including the information transmission device 200 and the security device 201 to which the control device 101 is connectable. In this validity determination method, first, the information transmission device 200 transmits, to the security device 201, generation information to be used for generating reference identification information. Next, the security device 201 generates reference identification information by using the generation information received from the information transmission device 200 via the in-vehicle network 12. Next, the security device 201 acquires identification information of the control device 101 connected thereto. Next, the security device 201 compares the acquired identification information with the generated reference identification information, and determines validity of the control device 101 connected thereto, based on the comparison result.

In the configuration and method described above, the reference identification information is generated by using the generation information transmitted between the information transmission device 200 and each of the dispersedly arranged security devices 201, and validity of the control device 101 is determined by using the generated reference identification information. Therefore, for example, even when one of the information transmission device 200 and the security device 201 is attacked, an invalid control device connected to the security device 201 can be more reliably detected.

Therefore, in the security system and the validity determination method according to the first embodiment of the present disclosure, it is possible to realize an excellent function regarding security in the network.

In the security device 201 according to the first embodiment of the present disclosure, the interface unit 210 receives generation information from the information transmission device 200 connected to the security device 201 via the in-vehicle network 12. The generation unit 220 generates reference identification information by using the generation information received by the interface unit 210. The acquisition unit 240 acquires identification information of the control device 101 connected to the security device 201. The determination unit 230 compares the reference identification information generated by the generation unit 220 with the identification information acquired by the acquisition unit 240, and determines validity of the control device 101 connected to the security device 201, based on the comparison result.

The validity determination method according to the first embodiment of the present disclosure is a validity determination method used in the security device 201 to which the control device 101 is connectable. In this validity determination method, first, the security device 201 receives generation information from the information transmission device 200 connected to the security device 201 via the in-vehicle network 12. Next, the security device 201 generates reference identification information by using the received generation information. Next, the security device 201 acquires identification information of the control device 101 connected to the security device 201. Next, the security device 201 compares the generated reference identification information with the acquired identification information, and determines validity of the control device 101 connected to the security device 201, based on the comparison result.

In the configuration and method described above, the reference identification information is generated by using the generation information transmitted between the information transmission device 200 and each of the dispersedly arranged security devices 201, and validity of the control device 101 is determined by using the generated reference identification information. Therefore, even when one of the information transmission device 200 and the security device 201 is attacked, an invalid control device connected to the security device 201 can be more reliably detected.

Therefore, in the security device and the validity determination method according to the first embodiment of the present disclosure, it is possible to realize an excellent function regarding security in the network.

Next, another embodiment of the present disclosure will be described with reference to the drawings. In the drawings, the same or corresponding parts are denoted by the same reference signs, and descriptions thereof are not repeated.

Second Embodiment

In contrast to the security system 401 according to the first embodiment, this second embodiment relates to a security system 402 in which an identification information transmission unit 140 and a storage unit 150 are included in a connector 301. The security system 402 is identical to the security system 401 of the first embodiment except for the content described below.

Figure 6:
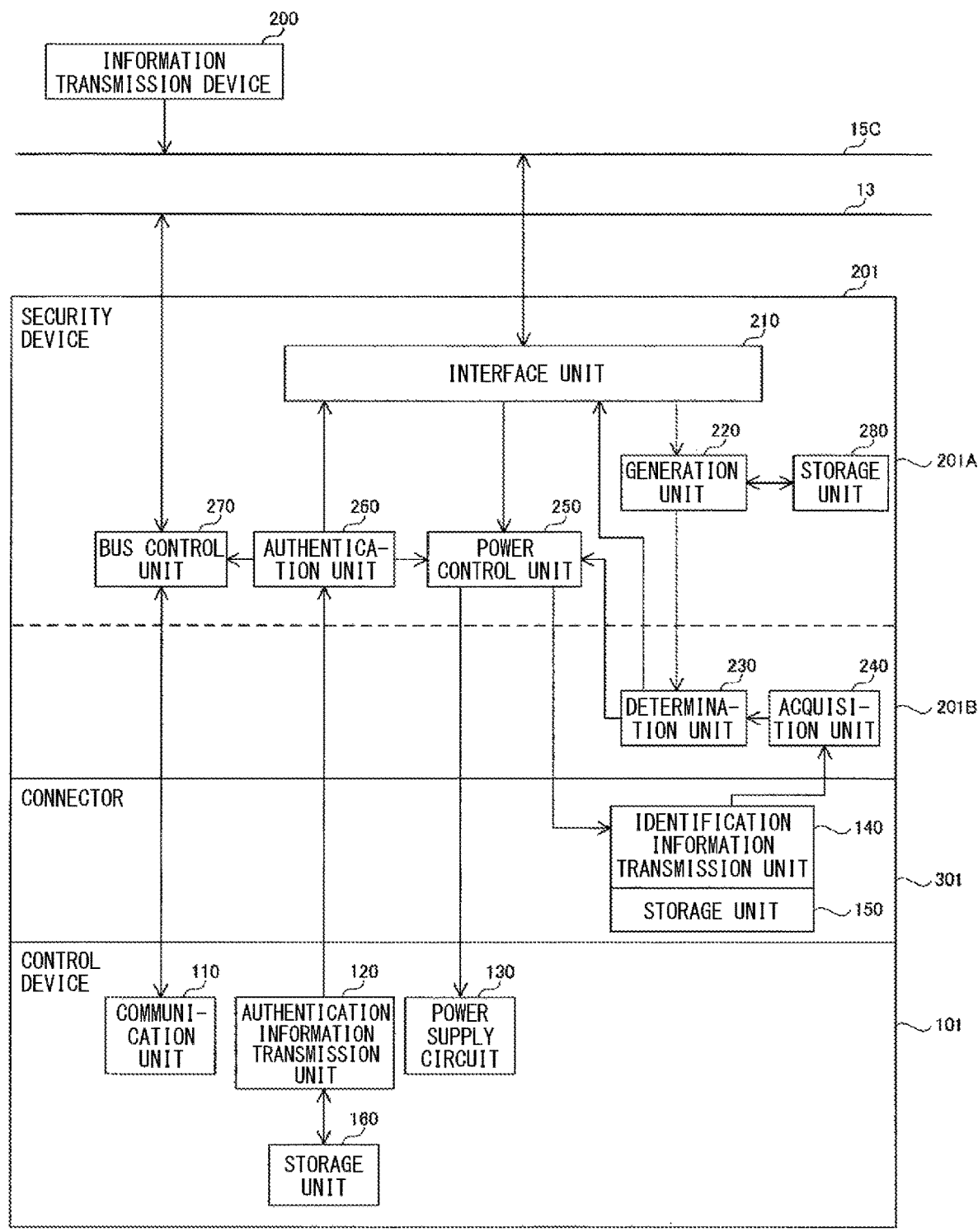
FIG. 6 shows a configuration of a security system according to a second embodiment of the present disclosure.

FIG. 6 shows a configuration of the security system according to the second embodiment of the present disclosure.

With reference to FIG. 6, the control device 101 includes a communication unit 110, an authentication information transmission unit 120, a power supply circuit 130, and a storage unit 160.

The connector 301 includes an identification information transmission unit 140 and a storage unit 150.

For example, the storage unit 150 in the connector 301 stores therein the ID of a control device 101 to be connected to the connector 301.

Upon receiving a supply instruction S1 from the interface unit 210, the power control unit 250 in the security device 201 starts to output a power supply voltage to the identification information transmission unit 140 in the connector 301, according to the received supply instruction S1.

Upon receiving supply of power from the power control unit 250 in the security device 201, the identification information transmission unit 140 in the connector 301 acquires the ID from the storage unit 150, and transmits identification information including the acquired ID, to the acquisition unit 240 in the security device 201. The identification information transmission unit 140 is an example of a transmission circuit for transmitting the identification information in the storage unit 150 to the security device 201.

Next, another embodiment of the present disclosure will be described with reference to the drawings. In the drawings, the same or corresponding parts are denoted by the same reference signs, and descriptions thereof are not repeated.

Third Embodiment

In contrast to the security system 401 according to the first embodiment, this third embodiment relates to a security system 403 in which a bus control unit 270 and a power control unit 250 are included in a connector 301. The security system 403 is identical to the security systems 401, 402 of the first and second embodiments except for the content described below.

Figure 7:
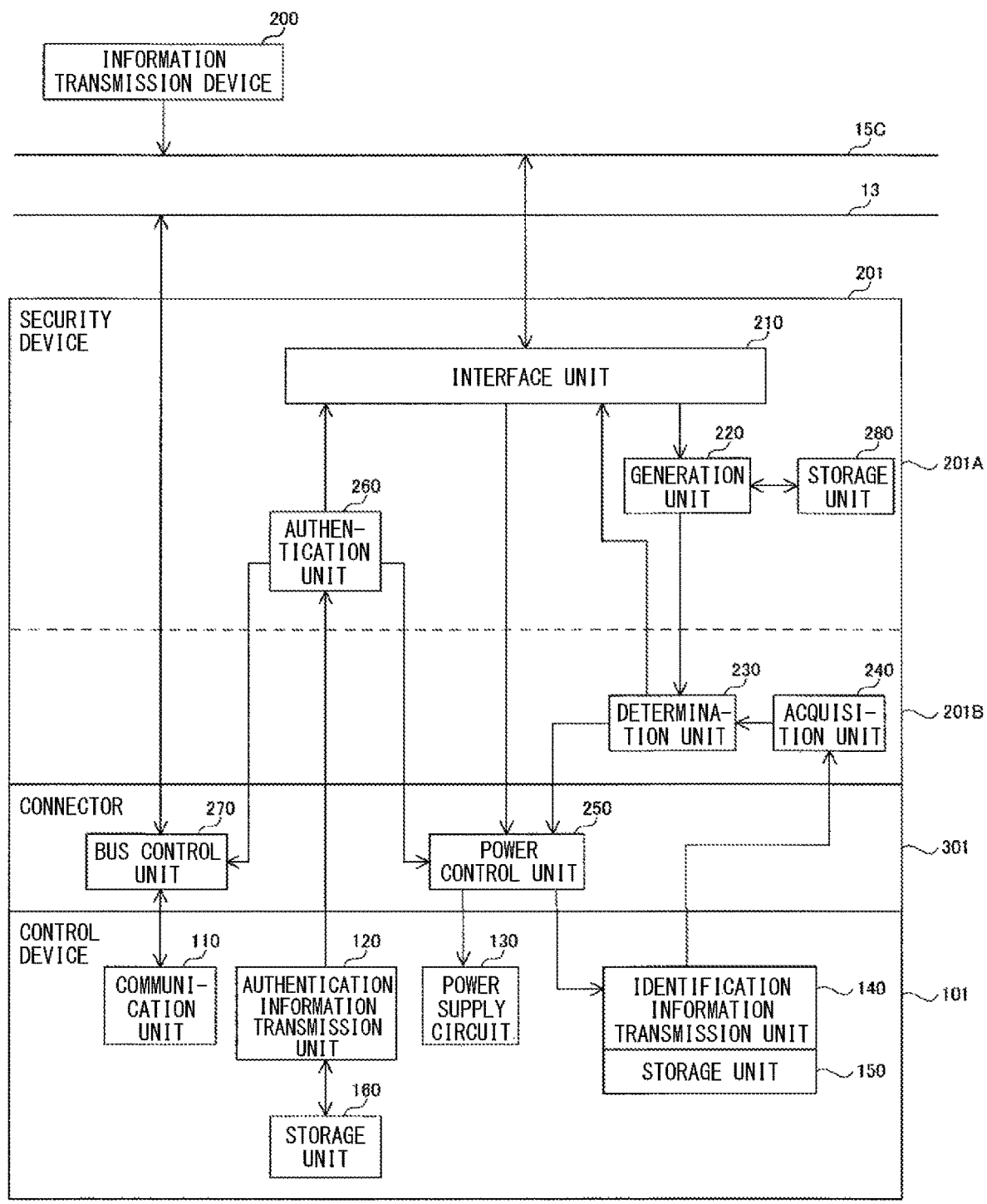
FIG. 7 shows a configuration of a security system according to a third embodiment of the present disclosure.

FIG. 7 shows a configuration of the security system according to the third embodiment of the present disclosure.

With reference to FIG. 7, a main body portion 201A of a security device 201 includes an interface unit 210, a generation unit 220, an authentication unit 260, and a storage unit 280. A connection portion 201B of the security device 201 includes a determination unit 230 and an acquisition unit 240.

The connector 301 includes a bus control unit 270 and a power control unit 250.

The power control unit 250 in the connector 301 performs a control of selecting whether or not to output, to the power supply circuit 130 in the control device 101, a power supply voltage received from the power supply circuit 50 via the power supply line 15C and the interface unit 210.

Upon acquiring the generation information from the frame received from the information transmission device 200, the interface unit 210 in the security device 201 outputs, to the power control unit 250 in the connector 301, a supply instruction S1 to start supply of power to the identification information transmission unit 140 in the control device 101.

Upon receiving the supply instruction S1 from the interface unit 210 in the security device 201, the power control unit 250 in the connector 301 starts output of a power supply voltage to the identification information transmission unit 140 in the control device 101, according to the received supply instruction S1.

For example, upon determining that the control device 101 connected to the security device 201 is valid, the determination unit 230 in the security device 201 outputs, to the power control unit 250 in the connector 301, a supply instruction S2 to start supply of power to the power supply circuit 130 in the control device 101.

Upon receiving the supply instruction S2 from the determination unit 230 in the security device 201, the power control unit 250 in the connector 301 starts output of a power supply voltage to the power supply circuit 130 in the control device 101, according to the received supply instruction S2.

Meanwhile, upon determining that the control device 101 connected to the security device 201 is not valid, the determination unit 230 in the security device 201 outputs, to the power control unit 250 in the connector 301, a stop instruction S3 to stop supply of power to the identification information transmission unit 140 in the control device 101.

Upon receiving the stop instruction S3 from the determination unit 230 in the security device 201, the power control unit 250 in the connector 301 stops output of the power supply voltage to the identification information transmission unit 140 in the control device 101, according to the received stop instruction S3.

The authentication unit 260 in the security device 201 performs an authentication process for the control device 101, based on authentication information received from the authentication information transmission unit 120 in the control device 101. When the authentication unit 260 has succeeded in authentication of the control device 101, the authentication unit 260 outputs authentication success information indicating the success of authentication, to the bus control unit 270 in the connector 301.

The bus control unit 270 in the connector 301 receives the authentication success information from the authentication unit 260 in the security device 201, and thereafter relays various kinds of information received from the control device 101 to a destination in-vehicle device via the bus 13.

Meanwhile, the authentication unit 260, which has failed in authentication of the control device 101, outputs, to the power control unit 250 in the connector 301, a stop instruction S4 to stop supply of power to the power supply circuit 130 and the identification information transmission unit 140 in the control device 101.

Upon receiving the stop instruction S4 from the authentication unit 260 in the security device 201, the power control unit 250 in the connector 301 stops output of the power supply voltage to the power supply circuit 130 and the identification information transmission unit 140 in the control device 101, according to the received stop instruction S4.

As described above, in the security system 403 according to the third embodiment of the present disclosure, the connector 301 includes the bus control unit 270 and the power control unit 250. Therefore, the cost of the security device 201 can be reduced as compared to the configuration in which the security device 201 includes the bus control unit 270 and the power control unit 250.

Next, another embodiment of the present disclosure will be described with reference to the drawings. In the drawings, the same or corresponding parts are denoted by the same reference signs, and descriptions thereof are not repeated.

Fourth Embodiment

In contrast to the security system 402 according to the second embodiment, this fourth embodiment relates to a security system 404 in which a bus control unit 270 and a power control unit 250 are included in a connector 301. The security system 404 is identical to the security systems 401 to 403 of the first to third embodiments except for the content described below.

Figure 8:
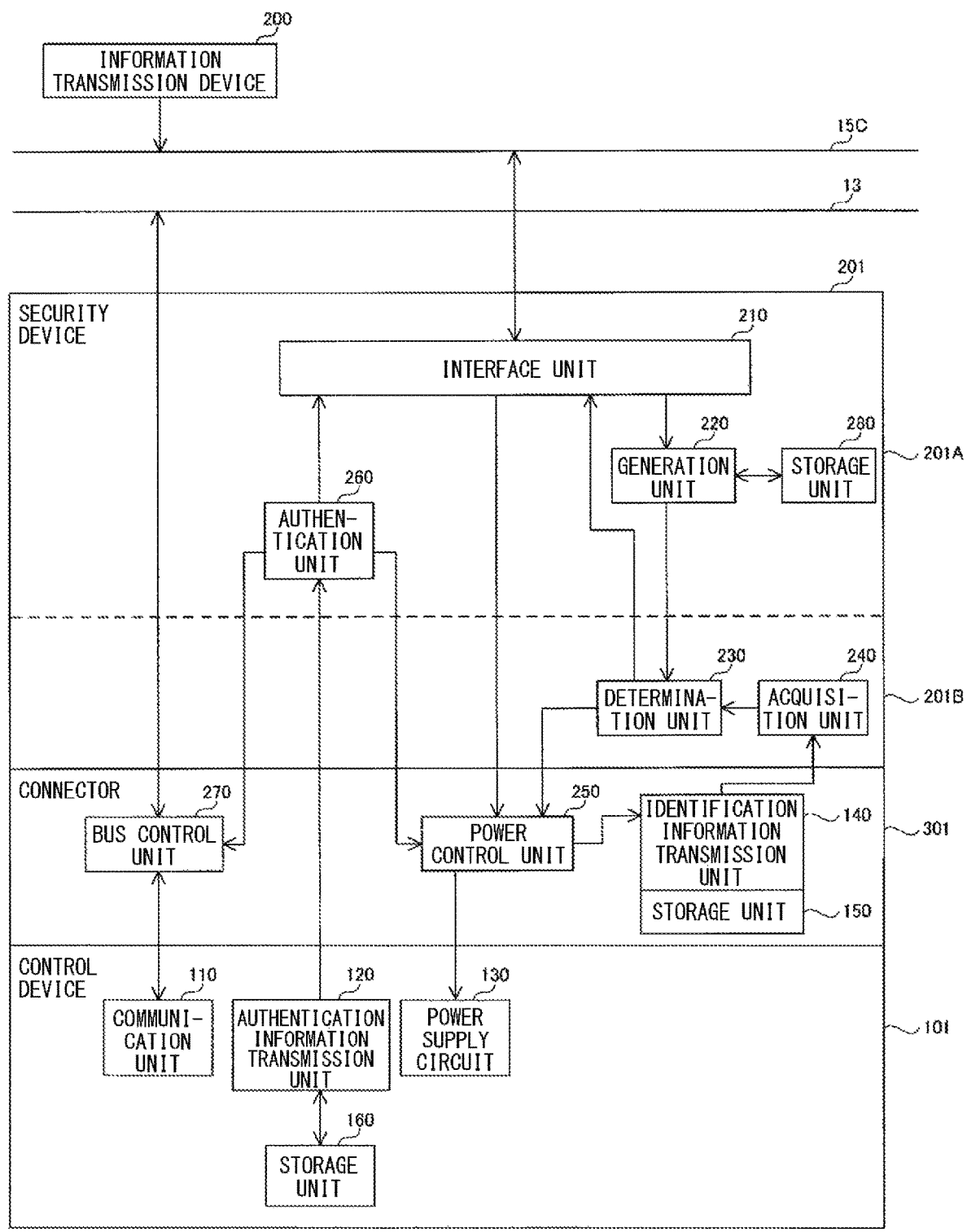
FIG. 8 shows a configuration of a security system according to a fourth embodiment of the present disclosure.

FIG. 8 shows a configuration of the security system according to the fourth embodiment of the present disclosure.

With reference to FIG. 8, a main body portion 201A of a security device 201 includes an interface unit 210, a generation unit 220, an authentication unit 260, and a storage unit 280. A connection portion 201B of the security device 201 includes a determination unit 230 and an acquisition unit 240.

The control device 101 includes a communication unit 110, an authentication information transmission unit 120, a power supply circuit 130, and a storage unit 160.

The connector 301 includes a bus control unit 270, a power control unit 250, an identification information transmission unit 140, and a storage unit 150.

The operations and functions of the units in the security device 201, the connector 301, and the control device 101 in the security system 404 are identical to those of the units in the security device 201, the connector 301, and the control device 101 of the security systems 401, 402, 403, and therefore, detailed descriptions thereof are not repeated.

As described above, in the security system 404 according to the fourth embodiment of the present disclosure, the connector 301 includes the bus control unit 270, the power control unit 250, the identification information transmission unit 140, and the storage unit 150. In this configuration, the cost of the security device 201 can be reduced as compared to the configuration in which the security device 201 includes the bus control unit 270 and the power control unit 250. Moreover, since the security device 201 can acquire the identification information from the control device 101 that does not include a configuration of a transmission circuit or the like, via the connector 301, it is possible to easily constitute a security system capable of determining validity of an existing control device 101 that does not include a configuration of a transmission circuit or the like.

The disclosed embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

A security system comprising:

an information transmission device; and a security device to which a target device is connectable, wherein the information transmission device and the security device are connected to each other via a network, the information transmission device transmits, to the security device, generation information to be used for generating reference identification information, the security device generates the reference identification information by using the generation information received from the information transmission device via the network, the security device acquires identification information of the target device connected to the security device, the security device compares the acquired identification information with the generated reference identification information, and determines validity of the target device connected to the security device, based on a result of comparison, and when the network is started up, the information transmission device transmits the generation information to the security device via a power supply line.

[Additional Note 2]

A security system comprising:

an information transmission device; and a security device to which a target device is connectable, wherein the information transmission device and the security device are connected to each other via a network, the information transmission device transmits, to the security device, generation information to be used for generating reference identification information, the security device generates the reference identification information by using the generation information received from the information transmission device via the network, the security device acquires identification information of the target device connected to the security device, the security device compares the acquired identification information with the generated reference identification information, and determines validity of the target device connected to the security device, based on a result of comparison, the network is an in-vehicle network, and the target device is an ECU.

[Additional Note 3]

A security device to which a target device is connectable, comprising:

a reception unit configured to receive generation information from an information transmission device connected to the security device via a network;

a generation unit configured to generate reference identification information by using the generation information received by the reception unit;

an acquisition unit configured to acquire identification information of the target device connected to the security device; and a determination unit configured to compare the reference identification information generated by the generation unit with the identification information acquired by the acquisition unit, and determine validity of the target device connected to the security device, based on a result of comparison, wherein when the network is started up, the reception unit receives the generation information from the information transmission device via a power supply line.

[Additional Note 4]

A security device to which a target device is connectable, comprising:
- a reception unit configured to receive generation information from an information transmission device connected to the security device via a network;
- a generation unit configured to generate reference identification information by using the generation information received by the reception unit:
- an acquisition unit configured to acquire identification information of the target device connected to the security device; and
- a determination unit configured to compare the reference identification information generated by the generation unit with the identification information acquired by the acquisition unit, and determine validity of the target device connected to the security device, based on a result of comparison, wherein the reception unit, the generation unit, the acquisition unit, and the determination unit are realized by a processor.

REFERENCE SIGNS LIST 1 vehicle
12 in-vehicle network
13 bus
14 Ethernet cable
15 power supply line
20 gateway device
30 in-vehicle communication device
40 bus connection device group
50 power supply circuit
101 control device
110 communication unit
120 authentication information transmission unit
130 power supply circuit
140 identification information transmission unit
150 storage unit
160 storage unit
200 information transmission device
201 security device
201A main body portion
201B connection portion
210 interface unit
220 generation unit
230 determination unit
240 acquisition unit
250 power control unit
260 authentication unit
270 bus control unit
280 storage unit
301 connector
401, 402, 403, 404 security system
501 communication system

The invention claimed is:

1. A security system comprising:
an information transmission device; and
a security device to which a target device is connectable, wherein the information transmission device and the security device are connected to each other via a network, the information transmission device transmits, to the security device, generation information to be used for generating reference identification information, the security device generates the reference identification information by using the generation information received from the information transmission device via the network, the security device acquires identification information of the target device connected to the security device, the security device compares the acquired identification information with the generated reference identification information, and determines validity of the target device connected to the security device, based on a result of comparison, the security device is able to individually control supply of power to a transmission circuit that is a circuit for transmitting the identification information to the security device, and supply of power to a target circuit that is a circuit included in the target device and different from the transmission circuit, and the security device starts to supply power to the transmission circuit upon receiving the generation information from the information transmission device, and starts to supply power to the target circuit upon determining that the target device is valid.

2. The security system according to claim 1, wherein the security device stops supply of power to the transmission circuit upon determining that the target device is not valid.

3. The security system according to claim 1, wherein the security device does not start to supply power to the target circuit upon determining that the target device is not valid.

4. The security system according to claim 1, wherein
the network includes a communication line and an auxiliary line,
the target device communicates with other equipment connected to the network, via the communication line, and
the information transmission device transmits the generation information to the security device via the auxiliary line.

5. The security system according to claim 4, wherein
upon determining that the target device is not valid, the security device performs at least one of: interrupting the communication line; transmitting an error notification to the communication line; and generating jamming in the communication line.

6. The security system according to claim 4, wherein the auxiliary line is a power supply line for supplying power to the security device.

7. The security system according to claim 1, further comprising a connector used in the target device and configured to connect the target device to the security device, wherein
the connector includes
a storage unit configured to store therein the identification information, and
the transmission circuit that is the circuit for transmitting the identification information in the storage unit to the security device.

8. A vehicle comprising the security system according to claim 1.

9. A security device to which a target device is connectable, comprising:

a reception unit configured to receive generation information from an information transmission device connected to the security device via a network;

a generation unit configured to generate reference identification information by using the generation information received by the reception unit;

an acquisition unit configured to acquire identification information of the target device connected to the security device;

a determination unit configured to compare the reference identification information generated by the generation unit with the identification information acquired by the acquisition unit, and determine validity of the target device connected to the security device, based on a result of comparison;

a power control unit configured to be able to individually control supply of power to a transmission circuit that is a circuit for transmitting the identification information to the security device, and supply of power to a target circuit that is a circuit included in the target device and different from the transmission circuit, wherein the power control unit starts to supply power to the transmission circuit upon receiving the generation information from the information transmission device, and starts to supply power to the target circuit upon determining that the target device is valid.

10. A validity determination method in a security system including an information transmission device and a security device to which a target device is connectable, the information transmission device and the security device being connected to each other via a network, the method comprising:

transmitting, by the information transmission device, generation information to be used for generating reference identification information, to the security device;

generating, by the security device, the reference identification information by using the generation information received from the information transmission device via the network;

acquiring, by the security device, identification information of the target device connected to the security device;

by the security device, comparing the acquired identification information with the generated reference identification information, and determining validity of the target device connected to the security device, based on a result of comparison;

by the security device, starting to supply power to a transmission circuit that is a circuit for transmitting the identification information to the security device upon receiving the generation information from the information transmission device; and by the security device, starting to supply power to a target circuit that is a circuit included in the target device and different from the transmission circuit upon determining that the target device is valid.

11. A validity determination method in a security device to which a target device is connectable, the method comprising:

receiving generation information from an information transmission device connected to the security device via a network;

generating reference identification information by using the received generation information;

acquiring identification information of the target device connected to the security device;

comparing the generated reference identification information with the acquired identification information, and determining validity of the target device connected to the security device, based on a result of comparison;

starting to supply power to a transmission circuit that is a circuit for transmitting the identification information to the security device upon receiving the generation information from the information transmission device; and starting to supply power to a target circuit that is a circuit included in the target device and different from the transmission circuit upon determining that the target device is valid.

\* \* \* \* \*